United States Patent [19]

Young

[11] Patent Number: 4,475,940

[45] Date of Patent: Oct. 9, 1984

[54] METHOD OF CONVERTING WASTE DROSS TO FERTILIZER

[75] Inventor: Harland H. Young, Western Springs, Ill.

[73] Assignee: Michigan Standard Alloys, Benton Harbor, Mich.

[21] Appl. No.: 458,774

[22] Filed: Jan. 18, 1983

Related U.S. Application Data

[63] Continuation-in-part of Ser. No. 275,249, Jun. 19, 1981, abandoned, which is a continuation-in-part of Ser. No. 133,624, Jan. 21, 1980, abandoned.

[51] Int. Cl.³ .............................................. C05B 7/00
[52] U.S. Cl. ............................................ 71/34; 71/41; 71/43; 71/64.03; 423/305
[58] Field of Search .................... 71/34, 41, 43, 25, 63, 71/29, 44, 53, 60, 62, 64.3; 75/24; 423/305

[56] References Cited

U.S. PATENT DOCUMENTS

| | | | |
|---|---|---|---|
| 2,086,565 | 7/1937 | MacIntire | 71/41 |
| 2,137,365 | 11/1938 | Strong et al. | 71/43 |
| 3,145,093 | 8/1964 | Wilson | 71/62 |
| 3,303,016 | 2/1967 | Boukidis | 71/62 |
| 4,075,284 | 2/1978 | Johnson | 423/244 |
| 4,252,776 | 2/1981 | Huckabay et al. | 75/24 X |

FOREIGN PATENT DOCUMENTS

| | | | |
|---|---|---|---|
| 2706077 | 8/1978 | Fed. Rep. of Germany | 71/64.3 |
| 54-111465 | 8/1979 | Japan | 71/25 |
| 54-135153 | 10/1979 | Japan | 71/64.3 |

*Primary Examiner*—Kenneth M. Schor
*Attorney, Agent, or Firm*—Leydig, Voit, Osann, Mayer & Holt, Ltd.

[57] ABSTRACT

A substantially dry, granulated, relatively dust free, and commercially valuable fertilizer product is obtained by treating the waste dross product from resmelting and purification of scrap aluminum with phosphoric acid.

10 Claims, No Drawings

METHOD OF CONVERTING WASTE DROSS TO FERTILIZER

RELATED APPLICATION

This application is a continuation-in-part of Young application Ser. No. 275,249 filed June 19, 1981 for Method for Converting Waste Dross to Fertilizer and now abandoned; which is in turn a continuation-in-part of Young application Ser. No. 133,624 filed Jan. 21, 1980, and now abandoned.

BACKGROUND AND OBJECTS OF THE INVENTION

This invention relates to fertilizer products and more particularly to a method of making a commercial fertilizer product which utilizes the dross waste product of scrap aluminum resmelting and purification operations.

In the various non-ferrous smelting operations, it is conventional to use a fluxing material not only to facilitate the fusion of the metal but to react with and remove many of the contaminating metallic impurities normally present in scrap aluminum. Among these impurities are traces of organic matter present as residues of plastics, fabrics of labels if the scrap metal is from old lawn furniture. Other impurities would be the labels printed directly upon aluminum containers such as beer cans. Scrap aluminum from automobile scrap metal is frequently contaminated with various lubricants or other organic accumulations. Scrap aluminum metal also includes metallic impurities that are preferably removed from the aluminum metal in the fluxing process. The metallic impurities, normally removed in this purification process, include a great many varieties of the so-called trace metals. Among these are the more common zinc, copper, iron, calcium, lead, and magnesium, and less common manganese, molybdenum, boron, sulfur, selenium, and the much more rare impurities including chromium, arsenic, silver, cadmium, and mercury. Even traces of platinum are not uncommon.

Whereas organic contaminant are usually eliminated by the combustion temperatures employed, the trace metal contaminates are trapped by the flux and eventually removed by skimming off the dross so produced. The fluxing material is usually a blend of sodium and potassium chlorides to which approximately five percent of cryolite (sodium aluminum fluoride) is added to promote melting of the scrap aluminum charged to the furnace for smelting. The ratio of potassium chloride to sodium chloride may also vary as required. Conventionally the amount of fluxing material used can vary widely depending upon the composition of the scrap aluminum to be processed. Typically, the flux amounts to about ten percent of the metal scrap charged to the furnace or metal bath. The fluxing material can be added to the molten metal immediately before, during, or immediately after the charging of the metal scrap. It is conventional to use a compressed air "lance" to thoroughly agitate the flux with the molten metal until the reaction is complete. At that point the flux containing the trapped metal impurities remains in a semifluid condition and floats on the surface of the molten aluminum metal. This dross can then be removed by skimming.

It is desirable to remove as much as possible of the magnesium which is usually present in amounts of less than one percent. This is done by gassing the molten metal with a chlorine "lance" to convert the magnesium into its chloride which is volatilized at furnace temperatures of 1500°–1600° F. Some aluminum chloride is formed and volatilized as well.

One experienced in the art of resmelting scrap metal is familiar with numerous other modifications that may be employed including the addition of small amounts of caustic soda, alkali silicates and other additives to improve subsequent handling of the skimmed dross or improve the purification process being effected by the fluxing operation.

In any case, the dross is removed by skimming and allowed to solidify in large chunks, usually in iron or steel containers, for subsequent processing. The subsequent processing comprises the separation of recoverable aluminum for resmelting, and disposal of the waste dross product. This processing includes grinding the solid waste dross into a powder form, from which aluminum flakes are separated by a screening operation.

Disposition of the powdered waste dross remaining after the screening operation presents several problems. The volume of such dross can amount to hundreds of tons per day, and is therefore a disposal problem of some magnitude. Further, the powdered waste dross is extremely dusty. The actual cost of disposal for such large tonnages of waste material is a major expense item and has been so for many years.

Accordingly, it is a general object of the present invention to provide a new method of disposing of waste dross that avoids the problems associated with conventional disposal methods.

A further object is to provide a process for converting the dross from a disposable waste product into a salable commodity having a value on its own.

A more particular object is to provide an economical process for converting waste dross into chemical fertilizer of commerical value.

Other objects and advantages of the present invention will become apparent to those skilled in the art upon reading the following detailed description. Although specific procedures are used to describe the preferred embodiment of my invention, I do not wish to be limited thereby. On the contrary, I wish to cover the various obvious alternatives and equivalents which may be included within the spirit and scope of the appended claims.

DESCRIPTION OF THE INVENTION

In accordance with the present invention, the dry and dusty powdered dross waste product from resmelting scrap aluminum is converted into a granulated, commercially valuable fertilizer product by reacting the dross waste product with phosphoric acid that is at least about 65% concentrated.

Nitrogen, phosphorus, and potassium are three nutrients drawn from the soil that are needed by plants in relatively large quantities. Accordingly, the materials used to manufacture fertilizer products must generally supply these nutrients. The composition of commercial fertilizer products is conventionally given in terms of: percent elemental nitrogen-percent $P_2O_5$-percent $K_2O$. Thus, a fertilizer graded 6-10-4 contains 6% N, the equivalent of 10% $P_2O_5$ (i.e. 4.36% available P), and the equivalent of 4% $K_2O$ (i.e. 3.32% K).

The waste dross produced in resmelting aluminum metal contains potassium as a result of the use in the resmelting process of flux containing 45 to 50% KCl. The resulting dross typically contains the equivalent of about 5 to 7% $K_2O$. However, if this were the only plant nutrient present in the waste dross, its value as a material to be processed into a fertilizer product would be insufficient to compensate for freight charges incurred in moving it.

I have found that nitrogen, a second principal plant nutrient, is also present in the waste dross to the extent of about 2 to 4%. Scrap aluminum metal, as pointed out previously, contains numerous trace elements, some of which catalyze the fixation of atmospheric nitrogen by reaction with hydrogen to form ammonia. Air, which is 80% nitrogen, is used during the resmelting process to agitate the flux and molten scrap metal. Simultaneously, the combustion of the natural gas or fuel oil used to maintain the furnace temperature produces carbon dioxide, carbon monoxide, and steam, setting up a form of hydrogen generator. This, in the presence of a variety of metallic catalysts, is believed to cause conversion of atmospheric nitrogen into ammonia, which is retained or absorbed by the slag.

In addition to potassium and nitrogen, waste dross contains ample quantities of numerous essential trace metal nutrients such as zinc, copper, molybdenum, boron, calcium, magnesium, and maganese.

Phosphorus is the one primary plant nutrient that is not present in the waste dross. Any number of phosphorus rich materials could be blended with the waste dross to supply the desired amount of phosphorus. Similarly, any number of nitrogen rich materials could be incorporated in the waste dross to increase the nitrogen levels, if desired. Separate manufacturing steps would then be required to (1) fix the nitrogen that is present in the waste dross as ammonia, and (2) convert the dusty waste dross to a suitable granulated form.

I have discovered that combining the waste dross with phosphoric acid that is at least 65% concentrated has the surprising result of simultaneously (1) supplying the desired phosphorus, (2) fixing the nitrogen that is present in the dross as ammonia and (3) converting the dross from a dry and dusty form to a granulated form, all in a single step. More particularly, when phosphoric acid that is 65% to 85% concentrated is blended with waste dross, the ammonia present in the dross as a result of the catalyzed reaction of natural gas or fuel oil with nitrogen from air, as described above, reacts with, and, it is believed, is neutralized by the phosphoric acid added to the waste dross in accordance with the method of the present invention. Thus the ammonia in the dross is readily absorbed into the reaction product of the dross. In other words, there is a fixation of the ammonia present in the dross as a result of the phosphoric acid addition.

In addition to the fixation of the ammonia by the phosphoric acid, the free metals and their oxides or carbonates which are present in the dross are also combined with the acid as complex mixed phosphates, pyrophoshates and metaphosphates. The net result is a plant food material that releases its nutrients slowly over a long period of time leaving an inert residue which tends to lighten and condition a heavy soil.

The reaction of the acid with the dross is sufficiently exothermic so that substantial evaporation of moisture and granulation of the final product to a dust free form occur without the necessity of providing additional heat. Wide variations in dross composition with respect to free aluminum metal powder do not interfere with the fixation of the ammonia by the phosphoric acid, but sufficient free metal must be available to produce the exothermic reaction required to drive off the moisture. The reaction mixture should be agitated continuously during the exothermic reaction.

The key to the success of dross utilization as a fertilizer material is the use of phosphoric acid in sufficiently concentrated form to effect sufficient exothermic heat of reaction to effectively eliminate the water present in the acid so as to provide, upon agitation, the formation of a dry, dustless, commercially useful plant food and/or soil conditioner directly from the reaction mass comprising phosphoric acid and dross, without the need for the provision of additional heat from an external source and further without the necessity of additional processing after the reaction has taken place.

I have found that phosphoric acid of 65-85% concentration may be used successfully but the commercial 75% strength acid is preferred. The 75% acid makes possible the utilization of a continuous procedure in which the dross is blended with the acid and tumbled in a rotating cylinder with a slight inclination. Cold or ambient temperature phosphoric acid is used.

The amount of phosphoric acid combined with the waste dross depends on the amount of phosphorus desired in the fertilizer product, but should generally be sufficient to provide a fertilizer product containing at least about 6% by weight of $P_2O_5$, and preferably between about 8 and 12% by weight of $P_2O_5$. An amount by weight of phosphoric acid that is at least about 20% the amount by weight of dross is suitable.

As the reaction of the phosphoric acid with the waste dross proceeds, drastic changes in physical form take place in the following steps:

(1) the blending promotes almost instant fluidity as gas evolution starts (the gas evolution arises from some carbonate decomposition but free metal powder solution is the major cause of the exothermic effect product);

(2) as the temperature rises sharply, the fluidity increases and moisture vapor is driven off;

(3) after a minute or two, the fluidity falls off sharply and the mass becomes more plastic as the temperature reaches a maximum of 250°–300° F.;

(4) water vapor is evolved rapidly and the plastic mass begins to crumble into a wet meal of particulate granules;

(5) the granules continue to dry without the addition of further heat and are slowly cooled by the moisture evaporation;

(6) the final product is a mass of dustless granules, the size of which can be controlled by the severity of agitation during the reaction period.

At various stages of this continuous reaction, one is free to control the composition by supplementing additional amounts of nitrogen or phosphorus in numerous forms or by adjusting the acidity by the addition of lime or other alkalies. Additional nitrogen, when desired can be provided by the addition of commercial urea or ammonium salts without any effect on the exothermic granulation effect.

Standard fertilizer granulation equipment is suitable for carrying out the invention and can be modified to produce any granulation desired. Numerous modifications of existing machinery can be employed and no claim is made for the use of such commercial equipment. Final adjustment of the finished product with respect to any excess acidity can be controlled by final blending with lime, limestone, magnesite or even anhydrous ammonia when such is desired. Such special control of pH is sometimes necessary when the product is to be used on soil requiring additional alkalinity.

The invention and various factors affecting its successful operation are further explained and described by the following examples. In each of the examples a dry, dustless, granulated product was formed by carring out the processing method described therein, and without the necessity of any further processing thereof. The dross powder used in these examples was obtained from a series of fluxing operations in which the flux comprised of 47.5% sodium chloride, 47.5% potassium chloride and 5% synthetic cryolite (potassium aluminum fluoride). One hundred pounds of this flux was added for every thousand pounds of scrap aluminum charged to the open hearth furnace, the total charge being about 100,000 pounds. A complete cycle of twenty-four hours employed the process essentially detailed in the above-background information.

EXAMPLE I

This example demonstrates the sequence of steps that take place during the reaction of the dross powder with the phosphoric acid. Two hundred grams of dusty powdered dross containing 2.4% nitrogen and 6% of potash equivalent was placed in a Pyrex beaker (600 cc) and treated with 47 grams of 75% phosphoric acid of agricultural grade. Agitation with a wooden rod was done by hand as vigorously as possible. Within one minute, the mass was fluid with copious gas evolution and the temperature had risen to 200° F. Within two minutes the mass was plastic but porous as steam evolved at temperatures above 250° F. Each successive minute produced a crumbling change as the granules formed to produce a wet meal. At the end of ten minutes the meal was substantially dry and quite warm with some moisture evaporation still taking place.

The final product, when analyzed as a fertilizer material, contained, on an 8% moisture basis, 2% nitrogen, 10% $P_2O_5$ and 5% $K_2O$. The particle size was very uniform averaging about 1/16"-3/32" in approximate diameters and produced almost no dust when poured from one container into another. An aqueous suspension of the product was slightly acidic (pH 4.8).

EXAMPLE II

Another two hundred gram sample of the same dross powder was blended with twenty grams of agricultural urea to increase the nitrogen level and then treated with fifty grams of 75% phosphoric acid. The same sequence of steps took place and the urea dissolved as the heat was evolved. Within ten minutes the granular product was substantially dry and definitely dustless. Analyses, on an 8% moisture basis, was 6% nitrogen, 10% $P_2O_5$ and 4.2% $K_2O$.

EXAMPLE III

An attempt was made using mono-ammonium phosphate to build up both nitrogen and phosphate levels but no exothermic reaction developed when various levels of moisture were added to a mixture of powdered waste dross and mono-ammonium phosphate. Although such blends had the usual fertilizer composition and hence value, they were extremely dusty and had to be granulated by the usual wetting and subsequent drying steps. The mono-ammonium phosphate was not sufficiently acidic to react with the powdered metals present and hence no complexing salt formation took place.

EXAMPLE IV

Two hundred grams of the powdered dross and thirty-five grams of agricultural grade ammonium sulfate were blended as in Example II and fifty grams of 75% phosphoric acid was added with vigorous agitation. The exothermic reaction took place as before, all amonia was fixed, and the reaction with metals was complete in a few minutes. Excellent granulation and drying during the exothermic stage produced a final product that the dustless and uniformly granulated. Analysis on an 8% moisture basis was 6.4% nitrogen, 9.2% $P_2O_5$ and 4.0 $K_2O$.

In order to demonstrate the ease with which this process can be applied, a standard dryer was used but no heat was applied to the normal jacket. The agitator with scraper arms was rotated at normal speeds and the interior was vented immediately after the phosphoric acid was blended. In the following examples the acid was introduced in the center opening of the dryer with the agitator scraper rotating.

EXAMPLE V

Two thousand pounds of dross powder was placed in a cylindrical dryer along with two hundred pounds of urea. With the agitator running, four hundred pounds of 75% phosphoric acid was introduced and as soon as heating commenced the dryer was vented. The whole mass became semifluid almost instantly and as the heat developed, steam was driven off vigorously while the plastic mass rapidly crumbled to a wet meal. Drying was completed in twenty minutes, at which point the finished dustless granulated product was discharged through the exiting opening.

EXAMPLE VI

This was a repeat of Example V except that three hundred fifty pounds of ammonium sulfate was substituted for the two hundred pounds of urea. There appeared to be no difference in the reaction time or amount of heat developed. Both products, on an 8% moisture basis, contained approximately 6% nitrogen, 10% $P_2O_5$ and 5% $K_2O$ and were suitable for lawn and garden use.

Prior to my invention, it was known that certain reduction furnace by-products could be used in producing fertilizers. For example, U.S. Pat. No. 2,086,565 to MacIntire is directed to treatment of calcium-containing materials with dilute mineral acid in the presence of an essential amount of calcium silicate to produce a calcium phosphate fertilizer. In this process, reduction furnace by-products that are rich in calcium silicate can be used as the source of the required calcium, the required calcium silicate, or both.

U.S. Pat. No. 3,303,016 to Boukidis is directed to a fertilizer product produced using blast furnace slag as a source of liming material. Suitable blast furnace slags contain about 33 to 42% silica and 36 to 45% lime.

U.S. Pat. No. 3,145,093 to Wilson is directed to a process for making a soil fertilizing solid hydrated silicous gelatinous product by mixing dry copper refining reverberatory furnace slag with a hot aqueous acid solution. The slag typically contains approximately 30% silicon dioxide.

Each of the foregoing prior art processes uses the slag by-produce of an ore reduction furnace as a source of calcium or silicon or both. In ore reduction furnaces silicon rich metal ores are reduced to metals by heating with charcoal or carbon. In such reduction furnaces, lime is added to convert the silicon to calcium silicate. For example, silicon is the major impurity in iron ore and it is converted to calcium silicate by adding lime to the reduction furnace. Hence, the slag produced is predominantly calcium silicate.

The waste dross obtained from resmelting scrap aluminum metal is a very different product from reduction furnace slags. Resmelting of scrap aluminum does not require addition of lime, because the aluminum metal is not an ore and contains only slight traces of silica traces of silica. Hence, the waste dross obtained from resmelting scrap aluminum metal contains relatively little, if any, of either calcium or silicon. Thus, the waste dross used in my invention is not used as a source of calcium or silicon, and can contain, for example, less than about 1 or 2 wt.% of each, or even less. On the other hand, if calcium or silicon is added to the waste dross used in my process, this is not necessarily harmful.

Thus, as has been seen, the present invention provides a method for converting dross of the type produced in resmelting aluminum form a waste product into a commercially valuable fertilizer product directly from the reaction mass without the need for further processing and includes the fixation of the nitrogen already present in the dross in the final product.

I claim:

1. A method of converting powdered dross waste of the type produced in resmelting scrap aluminum metal into a dustless granulated fertilizer product, said dross containing less than about 2 wt.% each of calcium and silicon and at least 2 wt.% nitrogen as ammonia which comprises mixing the powdered dross with phosphoric acid that is at least about 65% concentrated to provide a chemical reaction and to fix the nitrogen present in the dross and agitating the mixture during the reaction to provide said granulated fertilizer product.

2. A method of converting powdered dross waste into a dustless fertilizer product in accordance with claim 1 in which the phosphoric acid is between about 65% and 85% concentrated.

3. A method of converting powdered dross waste into a dustless fertilizer product in accordance with claim 1 in which the concentration of the phosphoric acid is about 75%.

4. A method of converting powdered dross waste into a dustless fertilizer product in accordance with claim 1 wherein the amount of phosphoric acid reacted with the powdered dross is sufficient to provide a fertilizer product containing the equivalent of at least about 6% by weight of $P_2O_5$.

5. A method of making fertilizer product which comprises the steps of:
   (1) mixing powdered waste dross obtained from the resmelting of scrap aluminum, said dross containing less than about 2 wt.% each of calcium and silicon, and at least 2 wt.% nitrogen as ammonia, with phosphoric acid that is at least 65% concentrated to fix the nitrogen present in the dross, said dross waste containing sufficient free metal to react exothermically with the phosphoric acid so that substantial evaporation of the moisture present in the acid occurs from the heat generated by the exothermic reaction,
   (2) agitating the mixture during the exothermic reaction to produce substantially dry, dustless granulated particles.

6. The method of claim 5 in which the amount of phosphoric acid mixed with the dross waste is sufficient to provide a fertilizer product containing the equivalent of at least about 6% by weight of $P_2O_5$.

7. The method of claim 6 which includes the step of adding a nitrogen containing compound to the dross waste prior to step (1) to increase the nitrogen content of said fertilizer product.

8. The method of claim 5 in which the amount of phosphoric acid mixed with the dross waste is sufficient to provide a fertilizer product containing the equivalent of between about 8 and 12% by weight of $P_2O_5$.

9. The method of claim 5 wherein the amount by weight of phosphoric acid mixed with the dross waste is at least about 20% the amount by weight of dross waste.

10. The method of claim 5 in which said dross contains at least about 2 wt.% nitrogen and the equivalent of at least about 5 wt.% $K_2O$.

* * * * *